Jan. 16, 1945.  W. P. COUSINO  2,367,204
PLASTIC INJECTING APPARATUS
Filed March 10, 1943   3 Sheets-Sheet 1
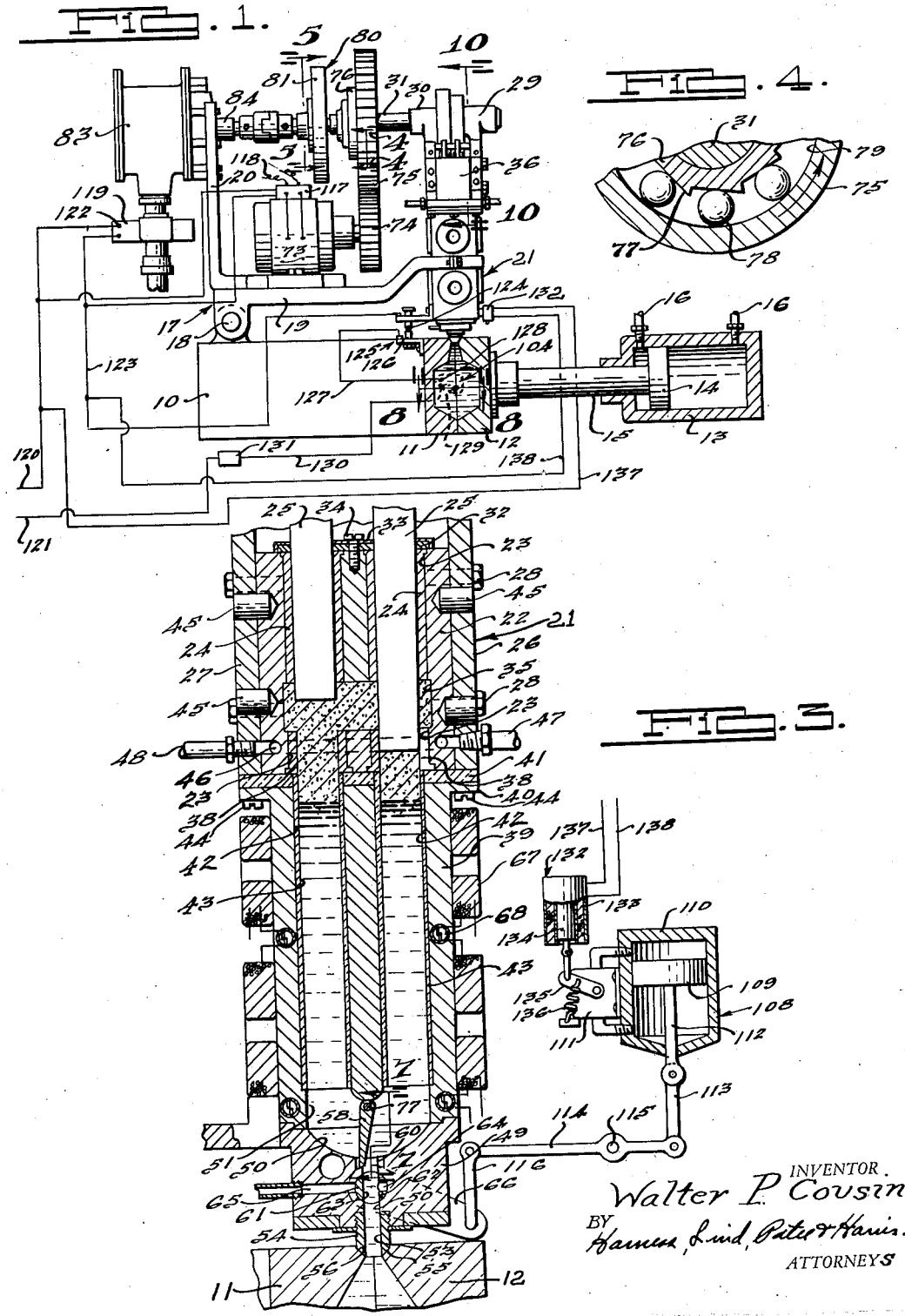
INVENTOR.
Walter P. Cousino
BY
ATTORNEYS

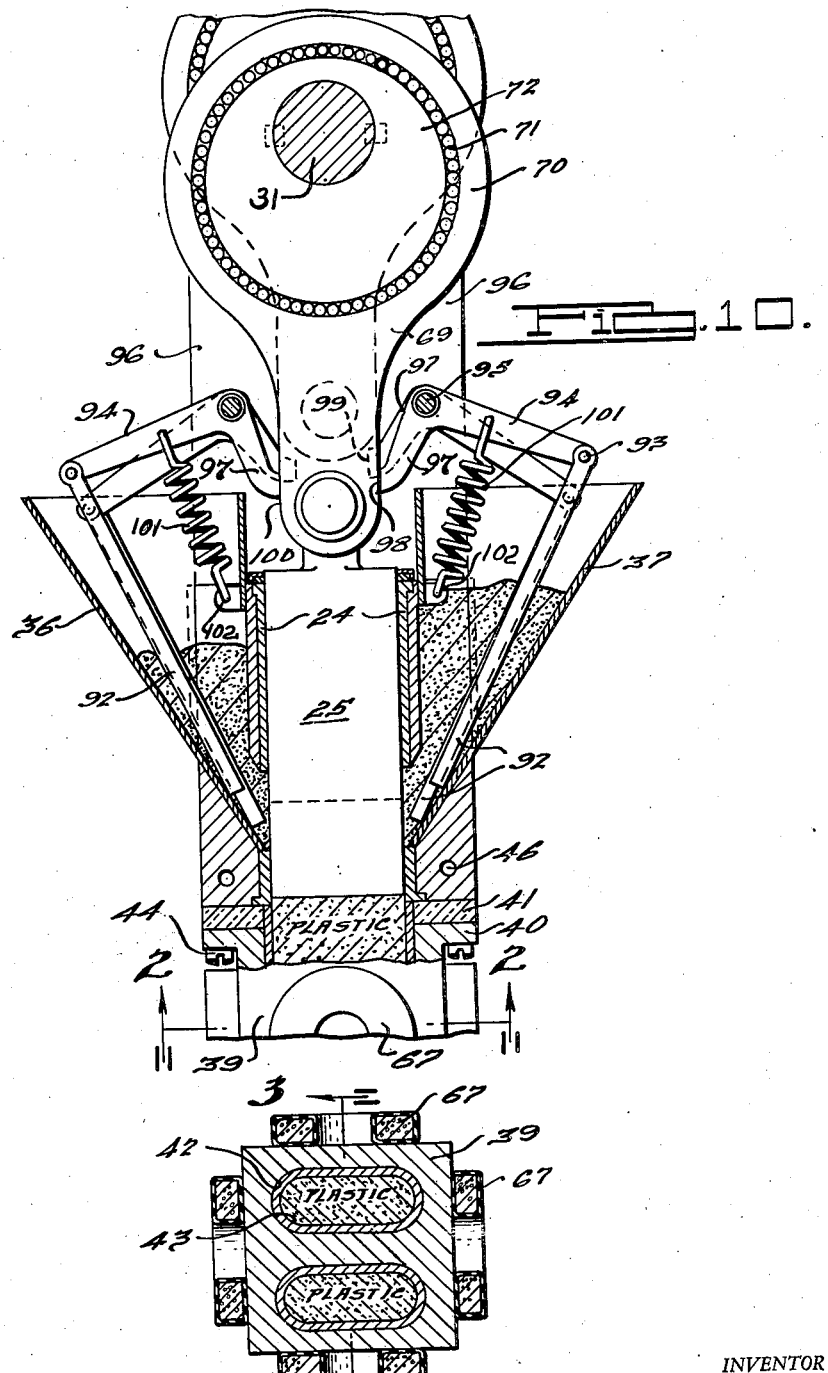

Jan. 16, 1945. W. P. COUSINO 2,367,204
PLASTIC INJECTING APPARATUS
Filed March 10, 1943 3 Sheets-Sheet 3
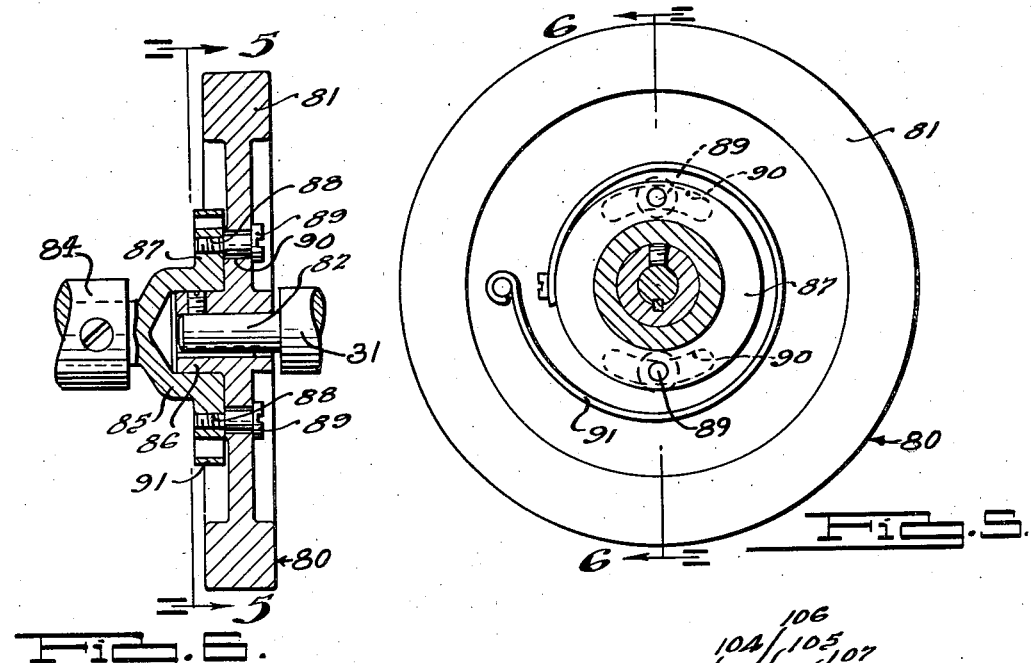

Patented Jan. 16, 1945

2,367,204

UNITED STATES PATENT OFFICE 2,367,204

PLASTIC INJECTING APPARATUS

Walter P. Cousino, Detroit, Mich., assignor to Chrysler Corporation, Highland Park, Mich., a corporation of Delaware Application March 10, 1943, Serial No. 478,617

16 Claims. (Cl. 18—30)

This invention relates to improved plastic injecting apparatus and method and is a continuation-in-part of my co-pending application Serial No. 410,233, filed September 10, 1941.

One of the main objects of the invention is to provide improved mechanism for displacing from apparatus of this kind, a sustained continuous discharge of plastic compound under suitable pressure for molding and extruding operations.

Other objects of the invention are to provide in apparatus of this kind a pair of plastic compound displacing plungers which are propelled in their respective cylinders throughout alternate discharge strokes, to provide valve mechanism which is actuated by the discharge of plastic compound from one cylinder to close the discharge end of the other cylinder in order to prevent a reverse flow of plastic compound in the latter cylinder; to provide a flapper type valve for this purpose which is adapted to remain in a partially open position with respect to the discharge ends of both cylinders when the apparatus is inoperative so that the pressure in both cylinders, under which the plastic compound is maintained, may be relieved; to provide improved valve mechanism for controlling the flow of plastic under pressure through a passage leading from the flapper valve chamber to the discharge nozzle of the apparatus; and to provide valve mechanism of this kind which also controls an escapement port through which plastic compound is exhausted in order to relieve the pressure in the cylinders when the apparatus is inoperative.

Additional objects of the invention are to provide improved driving mechanism for moving the plastic compound displacing plungers through alternate discharge strokes, to provide in a driving mechanism of this kind an overrunning clutch which accommodates a quick return action of each plunger throughout the initial part of its return stroke under the influence of the expansion of the compressed plastic compound which occurs immediately following passage of the plunger through its bottom dead center position; to provide plunger driving mechanism of this kind which utilizes the expansion force applied by the plastic compound on one plunger to accelerate the initial movement of the other plunger through the first stage of its discharge stroke so as to rapidly feed the compound to the cylinder and commence to compress it in order to asure a constant, even and uniform flow of plastic from the apparatus; to provide for thus increasing the rate of movement of the initial portions of the compression and return strokes of the plungers so as to increase the number of effective discharge strokes performed per minute and the evenness of the flow of plastic compound from the nozzle of the apparatus, and to provide an overrunning clutch in driving mechanism of this kind which safeguards the gear teeth and other parts through which torque is transmitted from injury from repeated shock.

Other objects of the invention are to provide in plunger driving mechanism of this character a secondary drive impulse creating means for cooperating with the expansion action of the plastic in augmenting the speed of the return strokes of the plungers and to provide a secondary drive unit of this kind having a flywheel and spring torque transmitting unit by which inertia generated during portions of the compression strokes of each plunger is applied on the plungers during portions of their return strokes.

An additional object of the invention is to provide improved mechanism for feeding plastic compound to the cylinders of the respective plungers of a plastic injecting apparatus of this kind.

Other objects of the invention are to provide improved control means for the driving mechanism of a plastic injecting apparatus of this kind; to provide a restricted passage in the wall portion of the apparatus within which plastic compound is subjected to compression during molding or extruding operations for accommodating the flow of plastic therethrough when the plastic is placed under pressure of a predetermined value, or for example, when the mold becomes filled or an extrusion die becomes clogged; and to provide switch means which is adapted to be actuated by the flow of plastic material from the foregoing passage for discontinuing operation of the driving mechanism when the predetermined pressure is attained. An illustrative embodiment of the invention is shown in the accompanying drawings in which:

Fig. 1 is a side elevational view, partly in section, of the apparatus embodying the invention.

Fig. 2 is a transverse sectional view taken on the line 2—2 of Fig. 10.

Fig. 3 is a fragmentary longitudinal sectional view taken on the line 3—3 of Fig. 2.

Fig. 4 is a fragmentary vertical sectional view taken on the line 4—4 of Fig. 1.

Fig. 5 is a fragmentary vertical sectional view taken on the line 5—5 of Fig. 1, or Fig. 6.

Fig. 6 is a transverse sectional view taken on the line 6—6 of Fig. 5.

Fig. 7 is a fragmentary vertical sectional view taken on the line 7—7 of Fig. 3.

Fig. 8 is a fragmentary horizontal sectional view taken on the line 8—8 of Fig. 1.

Fig. 9 is a fragmentary side elevational view showing the switch mechanism illustrated in Fig. 8.

Fig. 10 is a fragmentary vertical sectional view taken on the line 10—10 of Fig. 1.

In the form of the invention illustrated in the drawings, the improved plastic apparatus comprises a base structure 10 on which is mounted one of a pair of complementary mold parts 11 and 12. The mold part 12 is shiftable relative to the stationary mold part 11 and is provided with mechanism for moving it into and out of mating relationship with respect to the mold part 11. This mechanism may be constructed and designed in accordance with conventional mold operating structures, but for the purpose of illustration there is shown in the drawings a cylinder 13 having a piston 14 slidably mounted therein and connected with the shiftable die part 12 by a piston rod 15. The cylinder 13 is provided with fluid pressure inlets 16 by which fluid under pressure may be selectively admitted to respectively opposite sides of the piston 14 in order to open and close the mold.

The frame structure, generally designated by the numeral 17 is pivotally mounted at 18 upon the base 10, as illustrated in Fig. 1. This frame comprises a lower horizontal flange 19 and a vertically extending post 20. The axis of the pivotal connection 18 between the base 10 and the frame 17 is so disposed as to accommodate pivotal shifting of the plastic injection apparatus, hereinafter described, with respect to the mold.

Mounted on the right end portion of the horizontal flange 19 of the frame structure 17 is a combined plastic compound compressing and heating unit, generally designated by the numeral 21. The unit 21 includes a rectangular block 22 having adjacent passages 23 therein of elongated oval cross section. Mounted in each passage 23 is a plunger guide sleeve 24 in which a plunger 25 is reciprocably disposed. Plates 26 and 27 are fixed by bolts 28 to the right and left sides of the rectangular block 22, as viewed in Figs. 1 and 3. The plates 26 and 27 extend upwardly beyond the top extremity of the block 22 and are provided at their upper ends with bearings 29 and 30 respectively for rotatably supporting a crank member 31, hereinafter more clearly described. A sealing element comprising packing 32 and a sheet metal cap 33 having apertures therein through which the plungers 25 extend, is removably mounted on the upper extremity of the block 22 by a screw 34.

The block 22 has a horizontal slot 35 formed therein which intersects the passages 23 and into which plastic compound is fed from hopper members 36 and 37 disposed on the front and rear sides, respectively of the block 22.

Mounted in the lower portions of the passages 23, which are located below the horizontal slot 35, are sleeves 38 which serve as cylinders for receiving the lower end portions of the plungers 25 during their reciprocative movements although the passages 23, sleeves 38 and plungers 25 are of elongated oval cross sectional shape they are herein and in the claims, referred to as cylinders inasmuch as they function in connection with the plungers in substantially the same manner as the piston and cylinder.

Mounted on the lower extremity of the block 22 is a plastic compound heating unit which comprises a block 39 having a flange 40 at its upper extremity spaced from the lower extremities of the block 22 and plates 26 and 27 by a suitable heat insulating gasket 41. The block 39 has a pair of passages 42 each registering with one of the passages 23 of the block 22 and which preferably have the same cross sectional shape as that of the passages 23. Each passage 42 is provided with a tubular liner 43 through which plastic compound is conveyed under pressure and in which it is heated. The lower block 39 is held in place on the lower extremity of the upper block 22 by screws 44 which are threaded in apertures formed in the ends of the side plates 26 and 27. The side plates 26 and 27 may be pinned to the block 22 as illustrated at 45. Formed in the wall structure of the block 22 surrounding the cylinders 38 is a passage 46 through which cooling medium may be circulated by supplying it thereto from a conduit 47 and exhausting it therefrom through a conduit 48.

Mounted on the lower end portion of the block 39 is a valve body 49 having a recess 50 in its upper extremity, which communicates with a transverse slot 51 formed in the lower extremity of the block 39 and communicating with the passages through the sleeves 43. The space provided by the slot 51 and recess 50 accommodates plastic compound discharged through both of the sleeves 43 of the heating unit. The nozzle body 49 has a discharge passage 52 leading from the recess 50 to the outlet passage 53 of a nozzle fitting 54. The nozzle fitting 54 has a tapered lower extremity 55 which is adapted to seat upon a correspondingly tapered inlet opening 56 formed in the mold parts 11 and 12.

Pivotally mounted at 57 is a flapper valve 58 which extends transversely of the slot 51 and which is located below the lower extremities of the sleeves 43 and substantially midway between the downward projections thereof. The flapper valve 58 has a downwardly extending tongue 59 which extends into the discharge passage 52 and which is adapted to be received in notches 60 formed at diametrically opposite sides of the discharge passage. The flapper valve 58 is adapted to swing about its pivotal support 57 to bring the tongue 59 in one or the other of the notches 60 in order to establish connection between the lower end of either one of the sleeves 43 and the discharge passage 52 while obstructing the flow of plastic compound to the other sleeve 43.

Flow of plastic compound through the discharge passage 52 is controlled by valve mechanism comprising a valve stem 61 journalled in a bore 62 formed in the throttle body. The valve stem 61 has a transverse diametrically extending passage 63 which is axially aligned with the discharge passage when the valve is in open position so as to accommodate unobstructed flow of plastic compound from the nozzle structure. The valve stem 61 is also provided with a port 64 which, when the stem is rotated counterclockwise 90° from the position shown in Fig. 3, is adapted to communicate with the upper section of the discharge passage 52 and to accommodate the flow of plastic compound through the valve stem to an escapement passage 65 formed in the nozzle body 49. The valve stem 61 is provided with an external end portion on which is affixed a valve operating lever 66 which may be operated either manually or automatically as hereinafter more clearly set forth.

Heat may be applied to the wall structure of the heating unit in any suitable manner. In the form of the invention illustrated in the drawings, flat doughnut-shaped electrical heating coils 67 are provided for this purpose and suitably connected in an electric circuit (not shown) in which are included thermostatic elements 68 for controlling the temperature to which the plastic compound in the heating unit is subjected.

The plungers 25 are alternately reciprocated by the crank member 31 with which each plunger is connected by a connecting rod 69. Each connecting rod 69 has a bearing portion 70 journalled by a series of rolling contact elements 71 on a crank or eccentric 72 provided on the crank member. The eccentrics 72 are set apart substantially 180° in order to bring one plunger to the upper limit of its stroke while the other plunger is at the lower limit of its stroke. Mounted on the horizontal flange 19 of the bracket 17 is a motor 73 having a pinion 74 fixed on its shaft and meshed with a gear 75. The gear 75 is rotatably mounted on a hub member 76 fixed to the shaft 31. Formed on the hub member 76 are successive cam surfaces 77. A rotating bearing element 78 is disposed between each cam surface 77 and an inner peripheral surface 79 formed on the gear 75, as illustrated in Fig. 4. This structure provides a free wheeling unit during the operation of which the rolling contact elements 78 are wedged between the cam surfaces 77 and the inner periphery 79 of the gear when the gear is driven by the motor 74 in a counterclockwise direction, as viewed in Fig. 4. When, however, the rotative speed of the shaft 31 tends to exceed the rotative speed of the gear 75, the rolling contact elements 78 are released from binding engagement between the cam surfaces 77 and the inner periphery of the gear 75 thereby permitting overrunning of the shaft 31 with respect to the gear 75 in a counterclockwise direction.

As each plunger 25 reaches its bottom dead center position and commences its return stroke, expansion of the previously compressed plastic causes that plunger to be urged upwardly. The upward return movement of the plunger under consideration at an increased rate is accommodated by the free wheeling action which permits the shaft 31 to undergo instantaneous rotation at a speed in excess of that at which it is normally driven by the motor 73. The other plunger 25 is commencing its compression stroke as the first mentioned plunger starts its return stroke and since it is operating upon uncompressed plastic compound, the temporary acceleration in the rotative speed of the shaft 31 is not significantly opposed and the initial stages of the compression stroke of each piston take place at a faster rate than that predetermined by the speed of the motor 73. By thus increasing the speed of movement of the plungers at the initial stages of their compression and return strokes respectively, the capacity of the apparatus is accordingly increased. The free wheeling action safeguards the parts of the apparatus from abusive shock which would otherwise result from the expansive thrust of the plastic material upon each plunger following movement thereof past its bottom dead center position.

The foregoing driving apparatus may be relied upon to independently accelerate portions of the reciprocative strokes of the plungers 25 or it may be supplemented by a flywheel generally designated by the numeral 80. The flywheel 80 comprises an inertia member 81 which is fixed to an extension 82 of the shaft 31. The inertia of the flywheel tends to supplement the expansive action of the plastic in accelerating the rate of movement of each plunger during the initial stages of its return movement after passing its lower dead center position.

The foregoing acceleration of the movements of the plungers may be still further supplemented by a prime driving member, such as the air motor 83 which is resiliently connected with the flywheel. The air motor 83 has a shaft 84 provided on its free end with the coupling element 85 which is journalled on a hub portion 86 of the inertia member 81. The coupling memebr 85 has a radial flange 87 provided with openings 88 in which are threaded set screws 89. The set screws 89 extend through arcuate slots 90 formed in the web portion of the inertia member 81. A torsion spring 91 is secured at one end to the web portion of the inertia member 81 and at its other end to the periphery of the flange 87 as illustrated in Fig. 5.

During clockwise rotation of the coupling member 85 relative to the inertia member 81, the torsion spring 91 is tensioned and thus conditioned to exert a torque which is transmitted from the inertia member 81 through the shaft extension 82 and shaft 31 to the plungers 25. Expansion of the torsion spring 91 occurs immediately after the respective plungers pass their lower dead center positions thereby assisting in augmenting the speed of the initial stages of the return movements of the plungers. As the movement of the plunger 25 which is undergoing its compression stroke decreases in speed due to increased density of the plastic material operated upon, the angular velocity of the inertia element 81 is reduced to a value lower than that of the coupling 87 and the torsion spring 91 is thus tensioned and conditioned to perform another expansive action.

Plastic compound is fed from the hopper members 36 and 37 by a feeding mechanism which is operated in timed relation with respect to the reciprocative movements of the plungers 25. Associated with each plunger 25 is a pair of push rods 92, each having a free and slidably engaging the wall of the hoppers 36 and 37, respectively. The opposite end of each push rod 92 is pivotally attached at 93 to one arm 94 of a bell crank lever which is pivotally mounted at 95 on a post 96. The other arm 97 of each bell crank has cam following surfaces 98 and 99 which are adapted to engage a cam surface 100 formed on the lower extremity of the connecting rod 69. The cam following arm 97 of each bell crank and the associated cam surfaces of the connecting rod 69 are so shaped as to urge the pair of push rods 92, associated with each plunger 25, upwardly away from the outlet of the hopper as the plunger is moved downwardly, as viewed in Fig. 10 and to urge the push rods 92 downwardly as the plunger is returned from its compressive stroke. The downward movement of the push rods 92 is produced by coil springs 101 each having one end attached to an arm 94 of one bell crank and an opposite end fixed to a stationary bracket 102. The push rods 92 thus urge plastic compound toward the inlet end of the cylinder into which each plunger 25 projects while the latter is being withdrawn from the cylinder. As illustrated in Fig. 10, a portion of the downward movement of the push rods 92 occurs after the plunger has been withdrawn from its cylinder in order to assure the disposition of sufficient plastic material in registration with the lower extremity of the plunger prior to commencement of its next successive compressive stroke.

In Figs. 1, 8 and 9 of the drawings, there is shown a restricted tapered passage 103 in the mold into which plastic material may be injected by the foregoing apparatus. This passage preferably tapers outwardly from the mold cavity toward atmosphere and is formed at the parting line of the mold sections 11 and 12. The passage 103 is provided to accommodate the projection from the mold cavity of a plug of plastic material when the pressure in the mold exceeds a predetermined value such as that attained after the mold is filled. Mounted on the side of the mold section 11 is a switch member, generally designated by the numeral 104, which comprises a fixed contact 105 and a movable spring contact 106. The spring contact 106 extends beyond the fixed contact 105 into registration with the outlet of the passage 103 and is adapted to be deflected by engagement with a plug of plastic material designated by the numeral 107 to open the switch when the mold is filled.

The motor 73 and valve control lever 66 may be manually controlled if desired. In Figs. 1 and 3, however, is illustrated a control system by which all control functions may be performed automatically. This control system, as diagrammatically shown, comprises a fluid pressure piston and cylinder device generally designated by the numeral 108 having a piston 109 reciprocable in a cylinder 110 and valve mechanism 111 by which fluid under pressure may be admitted to and exhausted from the respectively opposite end portions of the cylinder 110. Fixed to the piston 109 is a piston rod 112 which is connected by a link 113 to one end of a lever 114, the latter being pivoted at 115. The opposite end of the lever 114 is pivotally connected by a link 116 to the valve lever 66.

The motor 73 is provided with an electrically operable switch 117 through which motor driving current is supplied to the motor from a power line 118. The air motor 83 is provided with an electrically operable valve 119. If desired the air motor 83 may be substituted for an electric motor in which case an electric switch for such motor would be used in place of the electrically operable valve mechanism 119.

The automatic control mechanism comprises a circuit which may be of a low voltage character and which comprises conductors 120 and 121 leading from a suitable power source. The conductor 121 is connected to one terminal 122 of the electrically operable valve mechanism 119 and the other terminal of the latter is connected by a conductor 123 with a movable contact member 124 of a switch mechanism generally designated by the numeral 125 which is adapted, as hereinafter more clearly set forth, to open the control circuit and thereby de-energize both motors 73 and 83 when the injecting apparatus is moved pivotally about its pivotal axis 18. The switch 125 comprises a fixed contact member 126 mounted on the mold section 11, as illustrated in Fig. 1. When the mold cavity is filled the back pressure of the plastic tends to force plastic material between the tapered seat 56 on the mold and the tapered extremity 55 on the nozzle fitting 54 thereby pivotally moving the injecting apparatus about its pivotal support 18. This movement causes separation of the fixed and movable contacts 126 and 124 respectively, thereby opening the switch 125.

The fixed terminal 126 of the switch 125 is connected by a conductor 127 with one terminal 128 of the switch 104. The other terminal 129 of the switch 104 is electrically connected by a conductor 130 with the conductor 121 leading from the source of power. A manually operable switch 131 may be connected in the conductor 121 for selectivity rendering the control system operative and inoperative respectively. When the switches 104, 124 and 131 are closed current is supplied to the electrically operable valve 119 and to the electrically operable switch 117 thereby energizing both motors 73 and 83. The plastic displacing apparatus is thus driven until the mold cavity is filled. As soon as this condition exists, the control circuit is opened either by the projection of a plug of plastic through the passage 103 which opens the switch 104 or by rotation of the injecting apparatus about its pivotal support 18. The passage 103 may be predetermined in size to accommodate the projection of a plug of plastic therethrough when the pressure in the mold exceeds a value lower than that required to open the switch 124. If, however, the mold becomes clogged in such a way as to obstruct the flow of plastic to the passage 103 then any pressure created in the inlet portion of the mold in excess of a predetermined value will rotate the injecting apparatus about its pivotal support 18 thus opening the switch 124 and de-energizing motors 73 and 83.

The nozzle control valve mechanism may also be automatically controlled in timed relation to starting and stopping of the plastic displacing apparatus driving mechanism by providing a solenoid generally designated by the numeral 132 comprising a coil 133 and a shiftable bar 134. The shiftable bar 134 is pivotally connected to a lever 135 of the valve 111. The valve 111 is preferably resiliently urged by a spring 136 toward one end of its stroke. The coil 133 is electrically connected by conductors 137 and 138 with the conductors 120 and 121 respectively as shown in Fig. 1. With this electrical control circuit, all of the switches are closed, the solenoid 132 is energized to rotate the valve lever 135 clockwise against the action of the spring 136 thereby admitting fluid pressure to the upper end of the cylinder 110 in order to urge the piston 109 downwardly so as to position the valve stem 61 in its open position. When any of the switches including switches 131, 124 and 104, are opened the solenoid 132 is de-energized and the spring 136 urges the lever 135 in a counterclockwise direction, as viewed in Fig. 3 thereby reversing the movement of the piston 109 and accordingly closing the valve 61.

With the foregoing control apparatus, the nozzle control valve is closed when the driving motors are de-energized and this valve is opened automatically when the motors are energized. The switches 104 and 124 safeguard the apparatus from injury by subjecting it to excessive pressures and facilitate automatic control thereof.

Although but one specific embodiment of the invention is herein shown and described, it will be understood that various changes in the sequence of operations, steps and materials employed may be made without departing from the spirit of the invention.

I claim:
1. In apparatus for injecting plastic compound including a hopper for such compound, a pair of cylinders each having their inlet ends disposed for receiving plastic compound from said hopper and a reciprocable plunger receivable in the inlet end of each cylinder; mechanism for drivingly reciprocating said plungers through alternate discharge strokes comprising a rotatable crank member operatively connected with said plungers, a driving member for rotating said crank member, and transmission means for drivingly connecting said driving member and said crank member including an overrunning clutch so constructed and arranged as to accommodate an increase in the angular velocity of said crank member under the action of expansion of said plastic compound in one cylinder on the plunger thereof during the initial stage of return movement of said plunger following a discharge stroke of the latter.

2. In apparatus for injecting plastic compound including a hopper for such compound, a pair of cylinders each having their inlet ends disposed for receiving plastic compound from said hopper and a reciprocable plunger receivable in the inlet end of each cylinder; mechanism for drivingly reciprocating said plungers through alternate discharge strokes comprising a rotatable crank member operatively connected with said plungers, a driving member for rotating said crank member, transmission means for drivingly connecting said driving member and said crank member including an overrunning clutch so constructed and arranged as to accommodate an increase in the angular velocity of said crank member under the action of expansion of said plastic compound in one cylinder on the plunger thereof during the initial stage of return movement of said plunger following a discharge stroke of the latter, a flywheel inertia member fixed to said crank member, a secondary driving member, and transmission means drivingly connecting said secondary driving member and said crank shaft member including resilient members normally loaded by the torque of said secondary driving member for aiding the expansive action of said plastic compound in increasing the angular velocity of said crank member accommodated by said overrunning clutch.

3. In apparatus for injecting plastic compound including a hopper for such compound, a pair of cylinders each having their inlet ends disposed for receiving plastic compound from said hopper and a reciprocable plunger receivable in the inlet end of each cylinder; mechanism for drivingly reciprocating said plungers through alternate discharge strokes comprising a rotatable crank member operatively connected with said plungers, a driving member for rotating said crank member, transmission means for drivingly connecting said driving member and said crank member including an overrunning clutch so constructed and arranged as to accommodate an increase in the angular velocity of said crank member under the action of expansion of said plastic compound in one cylinder on the plunger thereof during the initial stage of return movement of said plunger following a discharge stroke of the latter, a flywheel inertia member fixed to said crank member, a secondary driving member, means for providing a lost motion connection between said secondary driving member and said crank member, and a torsion spring interconnected between said latter means and said crank member so constructed and arranged as to be loaded by relative movement accommodated by said lost motion connection for aiding the expansive action of said plastic compound in increasing the angular velocity of said crank member during said initial stages of the return stroke of said last mentioned plunger.

4. Plastic injection molding apparatus including a mold member having a cavity therein and provided with an escapement port leading from said cavity to atmosphere adapted to accommodate a discharge of plastic compound from the interior of said mold when said cavity is filled, mechanism for heating and delivering plastic compound under compression to said mold cavity including a compressing unit and means for driving the latter, and a control system for said driving means including a member registering with said escapement port and movable by plastic compound forced therethrough when said cavity is filled for discontinuing operation of said driving means.

5. Plastic injection molding apparatus including a pair of complementary mold members having recesses in their adjacent sides for providing a mold cavity when said members are closed and having an escapement passageway leading from said cavity to atmosphere and comprising registering channel sections in the adjacent sides of said members, said passageway being constructed and arranged to accommodate a discharge of plastic compound from said cavity when the latter is filled, mechanism for heating and delivering plastic compound under pressure to said mold cavity including a compressing unit and means for driving the latter, and a control system for said driving means including a member having a portion registering with said escapement passageway and movable by plastic compound forced therethrough when said cavity is filled for discontinuing operation of said driving means.

6. Plastic injection molding apparatus including a pair of complementary mold members having recesses in their adjacent sides for providing a mold cavity when said members are closed and having an escapement passageway leading from said cavity to atmosphere and comprising registering channel sections in the adjacent sides of said members, said passageway being tapered toward the end thereof remote from said cavity and so constructed and arranged as to accommodate a discharge of plastic compound from said cavity when the latter is filled, mechanism for heating and delivering plastic compound under pressure to said mold cavity including a compressing unit and means for driving the latter, and a control system for said driving means including a member having a portion registering with said escapement passageway and movable by plastic compound forced therethrough when said cavity is filled for discontinuing operation of said driving means.

7. Plastic injection molding apparatus including a pair of complementary mold members having recesses in their adjacent sides for providing a mold cavity when said members are closed and having an escapement passageway leading from said cavity to atmosphere and comprising registering channel sections in the adjacent sides of said members, said passageway being tapered toward the end thereof remote from said cavity and so constructed and arranged as to accommodate a discharge of plastic compound from said cavity after the latter is filled and the pressure therein exceeds a predetermined value, mechanism for heating and delivering plastic compound under pressure to said mold cavity including a compressing unit and means for driving the latter, and a control system for said driving means including an electric circuit having a switch therein provided with a movable contact element, said movable contact element having a portion engageable and movable by plastic compound forced through said passageway when said mold is filled and said predetermined pressure thereon is exceeded for discontinuing operation of said driving means.

8. Plastic injecting molding apparatus including a pair of complementary mold members having recesses in their adjacent sides for providing a mold cavity when said members are closed and having an inlet and an escapement passageway, said escapement passageway being restricted and so constructed and arranged as to accommodate a discharge of plastic compound under pressure from said cavity after the latter is filled and a predetermined pressure is exceeded therein, mechanism for heating and delivering plastic compound to said mold cavity including a compressing unit and discharge nozzle registerable with said mold inlet, means for driving said compressing unit, means for shiftably supporting said mechanism for movement to bring said nozzle into and out of mold filling relationship with respect to said mold inlet, said mechanism being movable away from said inlet by pressure exerted on said nozzle after said mold is filled, and a control circuit for said driving means including two switches in series in said circuit, one of said switches having a movable contact element engageable by plastic compound discharged from said passageway for discontinuing operation of said driving means when the pressure in said mold cavity exceeds said predetermined value and the other switch including a contact element movable with said mechanism for discontinuing operation of said driving means in the event said flow of plastic compound from said passageway is obstructed.

9. Plastic injection molding apparatus including a mold member having a cavity therein and provided with an escapement port leading from said cavity adapted to accommodate a discharge of plastic compound from the interior of said mold when said cavity is filled, mechanism for delivering plastic compound under compression to said mold cavity including a compressing unit and means for driving the latter, and a control system for said driving means including a member registering with said escapement port and movable by plastic compound forced therethrough when said cavity is filled for discontinuing discharge operation of said driving means.

10. Apparatus for injection molding moldable material including a mold member having a cavity therein and provided with an escapement port leading from said cavity adapted to accommodate a flow of moldable compound from said mold cavity when the latter is filled, mechanism for discharging moldable material under pressure into said mold cavity including means for interrupting said discharge, and a control system for said means including a member registering with said escapement port and movable by moldable material forced therethrough when said cavity is filled for actuating said means to discontinue said discharge of moldable material.

11. Apparatus for injection molding moldable material including a pair of complementary mold members having engageable face portions, at least one of said face portions having a recess therein for providing a mold cavity and one of said face portions having a channel therein for providing an escapement passageway leading from said cavity, said passageway being constructed and arranged to accommodate a discharge of said moldable material from said cavity when the latter is filled, mechanism for supplying said moldable material under pressure to said mold cavity including means for interrupting said supply, and a control system for said means including a member having a portion registering with said escapement passageway and movable by moldable material forced therethrough when said cavity is filled for actuating said means to discontinue the discharge of moldable material from said mechanism.

12. Apparatus for injection molding moldable material including a mold member having a cavity therein and provided with an escapement port leading from said cavity adapted to accommodate a flow of moldable compound from said mold cavity when the latter is filled, mechanism for discharging moldable material under pressure into said mold cavity including a molding material discharge control valve, means for operating the latter, and a control system for said means including a member having a portion registering with said escapement port and movable by moldable material forced therethrough when said cavity is filled for actuating said means to close said valve.

13. Apparatus for injecting molding moldable material including a mold member having a cavity therein and provided with an escapement passageway leading from said cavity, said passageway being tapered toward the end thereof remote from said cavity and so constructed and arranged as to accommodate a discharge of plastic compound from said cavity when the latter is filled, mechanism for discharging moldable material under pressure into said mold cavity, and a control system for interrupting said discharge including a member registering with the small end of said tapered passageway and movable by moldable material forced therethrough for actuating said system to discontinue said discharge of moldable material.

14. Apparatus for injection molding moldable material including a mold member having a cavity therein and provided with an escapement port leading from said cavity adapted to accommodate a flow of moldable compound from said mold cavity when the latter is filled, mechanism for discharging moldable material under pressure into said mold cavity including a compressing unit and means for driving the latter, a valve in the outlet of said mechanism for shutting off the flow of moldable material to said cavity, and a control system for said driving means and valve including a member registering with said escapement port and movable by moldable material forced therethrough when said cavity is filled for discontinuing discharge operation of said driving means and closing said valve.

15. Apparatus for injection molding moldable material including a mold member provided with an inlet and having a cavity therein and provided with an escapement port leading from said cavity adapted to accommodate a flow of moldable material from said cavity when the latter is filled and a predetermined pressure is exceeded therein, mechanism for delivering moldable material to said mold cavity under pressure including a compressing unit and discharge nozzle registerable with said mold inlet, means for driving said compressing unit, means relatively shiftably mounting said mechanism and mold for bringing said nozzle into and out of mold filling relationship with respect to said mold inlet, said mechanism and mold being relatively movable by pressure exerted on said nozzle after said mold is filled, and a control circuit for said driving means including two switches in series in said circuit, one of said switches having a movable contact element engageable by moldable material discharged from said port for discontinuing discharge operation of said driving means when the pressure in said mold cavity exceeds said predetermined value and the other switch including a contact element responsive to relative movement of said mold and mechanism for discontinuing discharge operation of said driving means in the event said flow of moldable material from said port is obstructed.

16. Apparatus for injection molding moldable material including a mold member provided with an inlet and having a cavity therein and provided with an escapement port leading from said cavity adapted to accommodate a flow of moldable material from said cavity when the latter is filled and a predetermined pressure is exceeded therein, mechanism for delivering moldable material to said mold cavity under pressure including a discharge nozzle registerable with said mold inlet, a valve for interrupting the flow of moldable material to said cavity and for opposing back flow of moldable material from said cavity through said nozzle, means relatively shiftably mounting said mechanism and mold for bringing said nozzle into mold filling relationship with respect to said mold inlet, said mechanism and mold being relatively movable under pressure exerted on said nozzle by said moldable material when said cavity is filled, means for operating said valve, and a control circuit for said valve operating means including two switches in series in said circuit, one of said switches having a movable contact element engageable by moldable material discharged from said port for actuating said valve operating means to close said valve when the pressure in said mold cavity exceeds said predetermined value, and the other switch including a contact element responsive to relative movement of said mold and mechanism for actuating said valve operating means to close said valve in the event said flow of moldable material from said port is obstructed.

WALTER P. COUSINO.